(No Model.)
C. P. GOERZ & E. VON HÖEGH.
COMBINED LENS FOR PHOTOGRAPHIC PURPOSES.
No. 599,700.    Patented Mar. 1, 1898.
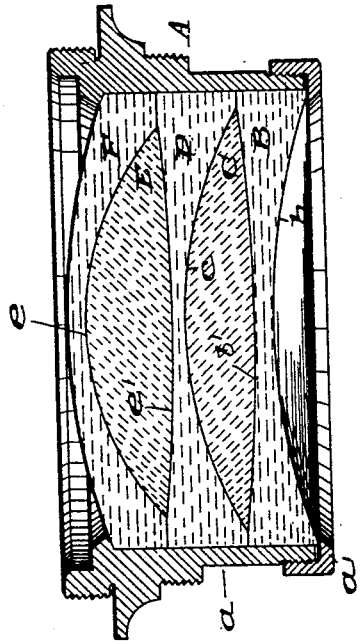
Witnesses:-
Inventors.
Carl P. Goerz
Emil von Höegh
By their Atty.

UNITED STATES PATENT OFFICE.

CARL PAUL GOERZ AND EMIL VON HÖEGH, OF SCHÖNEBERG, GERMANY.

COMBINED LENS FOR PHOTOGRAPHIC PURPOSES.

SPECIFICATION forming part of Letters Patent No. 599,700, dated March 1, 1898.

Application filed July 6, 1897. Serial No. 643,507. (No model.)

*To all whom it may concern:*

Be it known that we, CARL PAUL GOERZ and EMIL VON HÖEGH, citizens of the Kingdom of Prussia, and residents of Schöneberg, near Berlin, in the Kingdom of Prussia and German Empire, have invented certain new and useful Improvements in Combined Lenses for Photographic Purposes, of which the following is a specification.

Our invention relates to an objective-lens of that class used for photographic purposes having for its object to obviate astigmatism and spherical-distortion effects and to increase the strength of light and sharpness of the impression of the lens.

The invention therefore consists in the assembling together of a plurality of lenses of different indices of refraction into a single lens.

The invention further consists in the parts and arrangements of parts, as hereinafter described and claimed.

The drawing illustrates a section of a lens constructed and arranged in accordance with our invention.

The objective-lens when constructed in accordance with our invention consists of a series of five lenses united together and contained in a case or envelop A, comprising the body $a$ and the cap $a'$, each lens possessing certain special qualities, acting together, when the several separate lenses are assembled, to meet the object in view.

As seen in the figure, five separate lenses are employed, designated by the reference-letters B, C, D, E, and F, and the index of refraction of the several lenses in round numbers are 1, 51; 1, 61; 1, 52; 1, 54; and 1, 61, respectively.

In order to obtain the greatest possible strength of light, it is found that the first refracting concave surface $b$ of the lens B should have as small a refraction as possible, (1, 51,) while the last convex surface $f$ of the lens F should have as high a refraction as possible, (1, 61.) Furthermore, the first lens must be biconcave, so that at the second refracting-surface $b'$ there will be a cementing-surface acting as a collector of the light and compensating for the astigmatic aberrations, and in order that this surface be as flat as possible, which is desirable to prevent curving of the image, it is necessary that at this second refracting-surface as large as possible a difference between the refractive indices of the material of the first and second lens be present—that is, that the second lens C be formed of a glass of high refraction, (1, 61.) The second lens C must be biconvex, and to this must be applied a negative lens D of low refractive index, (1, 52,) so that at the third refracting-surface $c$ a cementing-surface acting as a light-collector opposed to the second one may be formed, which without increasing the astigmatism exercises a compensating influence upon the distortion which is the product of the other surfaces, so that by a right choice of the curvature of the surface $c$ the distortion for a main ray falling sidewise will be completely neutralized. For the compensation of the spherical divergence the surface $e$ is arranged. At this point there must not occur a difference in refractive index much greater than 1, 61 less 1, 54—*i. e.*, 0, 07—because it must have an exactly-fixed depth, which is determined by the direction of the principal rays, which must encounter it under as small a refractive angle as possible, because here otherwise the distortion influences would be collected, which can no longer be compensated by the surface $c$. From this condition and from the condition already set forth—namely, that the last lens must be constructed of as highly-refractive a material as possible (1, 61)—it becomes necessary to insert between the lens D and the lens F a further positive lens E of medium refraction, (1, 54.) This lens E can be either biconvex or concavo-convex, according to the positive or negative curvature of the surface $e'$ of the lens D. At this surface on account of the very slight difference of refractive index (about 0, 02) the errors of distortion and spherical divergence are very little influenced. The lens may be principally devoted to the complete removal of the chromatic divergence. With the increase of the number of lenses the difficulty of bringing the lenses into the combination in exactly central position and of maintaining the same permanently in this position is increased. In order to meet this difficulty, we have arranged in our five-lens system that the negative lenses B, D, and F possess a greater diameter than the positive lenses C and E inclosed by them and that the said negative lenses come in contact peripherally by means of their projecting vertical edges. They consequently completely inclose the positive lenses, which are immovably inclosed between the same, and in turn inclosed by the case A and are held in an immovable relation one to the other.

What we claim is—

1. An objective-lens comprising five lenses B, C, D, E, and F, each having an index of refraction substantially equal to 1, 51; 1, 61; 1, 52; 1, 54; and 1, 61; respectively, substantially as described.

2. An objective-lens comprising three negative lenses and two positive lenses interposed and housed between the same, substantially as described.

In testimony that we claim the foregoing as our invention we have signed our names in presence of two subscribing witnesses.

CARL PAUL GOERZ.
EMIL VON HÖEGH.

Witnesses:
W. HAUPT,
HENRY HASPER.